United States Patent
Aikawa et al.

[11] Patent Number: 5,995,695
[45] Date of Patent: Nov. 30, 1999

[54] DISPERSION COMPENSATING OPTICAL FIBER

[75] Inventors: Kazuhiko Aikawa; Akira Wada; Kuniharu Himeno; Ryozo Yamauchi, all of Sakura, Japan

[73] Assignee: Fujikura Ltd., Tokyo, Japan

[21] Appl. No.: 09/059,242

[22] Filed: Apr. 13, 1998

[30] Foreign Application Priority Data

Sep. 17, 1997 [JP] Japan .................................. 9-252496

[51] Int. Cl.$^6$ .................................................. G02B 6/02
[52] U.S. Cl. .................................................. 385/123
[58] Field of Search .................................. 385/123, 125, 385/127, 126, 24, 27, 28, 37, 31; 359/115, 124

[56] References Cited

U.S. PATENT DOCUMENTS

| | | | |
|---|---|---|---|
| 4,447,125 | 5/1984 | Lazay et al. | |
| 4,750,802 | 6/1988 | Bhagavatula | 385/31 |
| 4,768,853 | 9/1988 | Bhagavatula | 385/31 |
| 5,185,827 | 2/1993 | Poole | 385/28 |
| 5,261,016 | 11/1993 | Poole | 385/28 |
| 5,361,319 | 11/1994 | Antos et al. | 385/123 |
| 5,448,674 | 9/1995 | Vengsarkar et al. | 385/123 |
| 5,473,719 | 12/1995 | Stone | 385/123 |
| 5,555,340 | 9/1996 | Onishi et al. | 385/127 |
| 5,559,920 | 9/1996 | Chraplyvy et al. | 385/123 |
| 5,568,583 | 10/1996 | Akasaka et al. | 385/123 |
| 5,781,673 | 7/1998 | Reed et al. | 385/24 |
| 5,802,236 | 9/1998 | DiGiovanni et al. | 385/127 |

FOREIGN PATENT DOCUMENTS

| | | |
|---|---|---|
| 554 714 A1 | 8/1993 | European Pat. Off. . |
| 674 193 A2 | 9/1995 | European Pat. Off. . |
| 789 257 A1 | 8/1997 | European Pat. Off. . |

*Primary Examiner*—Akm E. Ullah
*Attorney, Agent, or Firm*—Pearne, Gordon, McCoy & Granger LLP

[57] ABSTRACT

The present invention is related to an dispersion compensating optical fiber technology, comprising a central core, a middle part with a refractive index lower than this central core, and a cladding with a refractive index higher than said middle part and lower than said central core, characterized in: an outer diameter of said middle part being 2.5~3.5 times an outer diameter of said central core; a relative refractive index difference of said cladding to said middle part being −0.08~−0.2% with the refractive index of the cladding being zero; and having substantially single-mode transmission in the wavelength 1.55 μm band, the chromatic dispersion being −80 ps/nm/km or less, the dispersion slope being +0.08 ps/nm$^2$/km or less, and the bending loss being 1.0 dB/m or less.

6 Claims, 8 Drawing Sheets

DISPERSION COMPENSATING OPTICAL FIBER

BACKGROUND OF THE INVENTION

1. Field of the Invention

The present invention relates to a dispersion compensating optical fiber, and in particular to a small dispersion slope, low loss dispersion compensating optical fiber. This application is based on patent application No. Hei 9-252496 filed in Japan, the content of which is incorporated herein by reference.

2. Description of Related Art

Accompanying the development of optical amplification technology, research is being carried out on increasing the strength of transmission light in order to provide better long distance transmission at wavelength 1.55 μm band by inserting erbium-doped optical fiber amplifiers at the receive end, transmit end, or an intermediate point of the optical communication system.

For example, optical communication systems using optical amplifiers, such as a very-long-distance non-repeating relay and multiple-distribution subscriber optical nets, are being fabricated and researched extensively.

A dispersion shifted optical fiber having a substantially zero chromatic dispersion at wavelength 1.55 μm band is desirable as a transmission line.

However, if the dispersion at wavelength 1.55 μm band is small, particularly in cases where the energy density of the transmission light within the optical fiber is large, such disadvantages as nonlinear effects arise, producing a deterioration in transmission characteristics.

Thus, as a method for suppressing nonlinear effects, a method of transmission at wavelength 1.55 μm using a single-mode optical fiber having a nearly zero dispersion at the conventional wavelength 1.3 μm (hereafter abbreviated as "1.3 μm SMF") in conjunction with a dispersion compensating optical fiber has been proposed.

For example, because the chromatic dispersion of a 1.3 μm SMF is roughly +17 ps/nm/km (positive dispersion value), a large chromatic dispersion is produced when it is used to provide optical transmission at wavelength 1.55 μm.

In contrast, at wavelength 1.55 μm a dispersion compensating optical fiber has a negative chromatic dispersion whose absolute value is comparatively large, and can negate chromatic dispersion produced at the comparatively short distances actually used in, for example, the conventional 1.3 μm SMF over several km.

Additionally, when a dispersion compensating optical fiber is incorporated into an optical system using a conventional 1.3 μm SMF, even if optical communication is carried out at wavelength 1.55 μm, it is possible to reduce the amount of chromatic dispersion to almost zero in the optical communication system as a whole.

Thus, in an optical communication system of wavelength 1.55 μm, the wavelength distortion due to chromatic dispersion can be suppressed.

Consequently, a dispersion compensating optical fiber with low loss and a comparatively large negative chromatic dispersion at wavelength 1.55 μm is necessary.

An optical fiber having a single-peak shaped refraction index profile (herein abbreviated as "single-peak profile") has been proposed as a dispersion compensating optical fiber.

Figure 7:
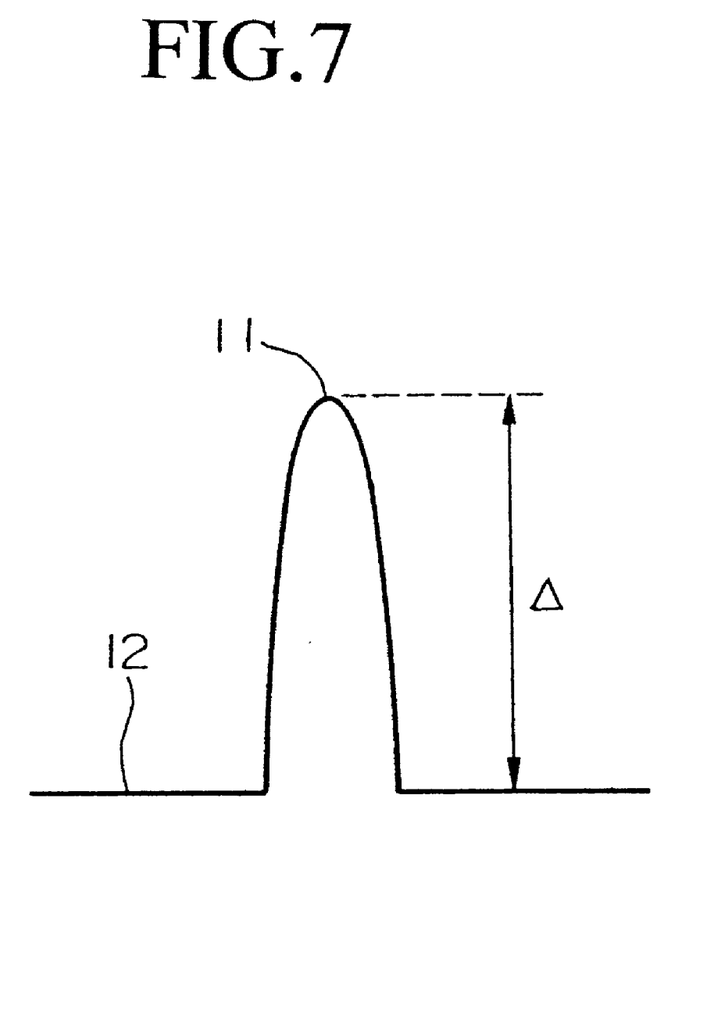
FIG. 7 is a drawing showing the single-peak refractive index profile used in the conventional dispersion compensating optical fiber.

FIG. 7 shows an example of a single-peak profile. The core 11 is disposed in the center, and a cladding 12 of lower refractive index than this core 11 surrounds it.

The above-mentioned core 11 consists of silica glass doped with germanium to increase the refractive index. The form of germanium used as the dopant is germanium dioxide ($GeO_2$).

The cladding 12 consists of silica glass.

Δ is a relative refractive index difference of the core 11 to the cladding 12, with the refractive index of the cladding 12 being the standard (zero).

This kind of dispersion compensating optical fiber having a single-peak profile is designed so that Δ is comparatively large and has a negative chromatic dispersion, which is able to compensate the chromatic dispersion of a 1.3 μm SMF. However, the problem of a large dispersion slope then arises.

When the dispersion slope of the dispersion compensating optical fiber becomes large, the dispersion slope of the system as a whole becomes large. As a result, the chromatic dispersion values of the wavelengths of the transmitted light pulse come to differ greatly. This is a disadvantage is applications such as WDM transmission which transmits a plurality of pulses of differing frequency.

Because of this, a dispersion compensating optical fiber having as small a dispersion slope as possible is needed.

On the one hand, the dispersion slope of a 1.3 μm SMF at wavelength 1.55 μm band is about +0.07 $ps/nm^2/km$ (positive value). Therefore, it is further desired that when the dispersion slope of the dispersion compensating optical fiber is a negative value, it is able to compensate the dispersion slope of a 1.3 μm SMF.

Thus, a dispersion compensating optical fiber that can make the dispersion slope smaller than that of a single-peak profile is desired.

Figure 1:
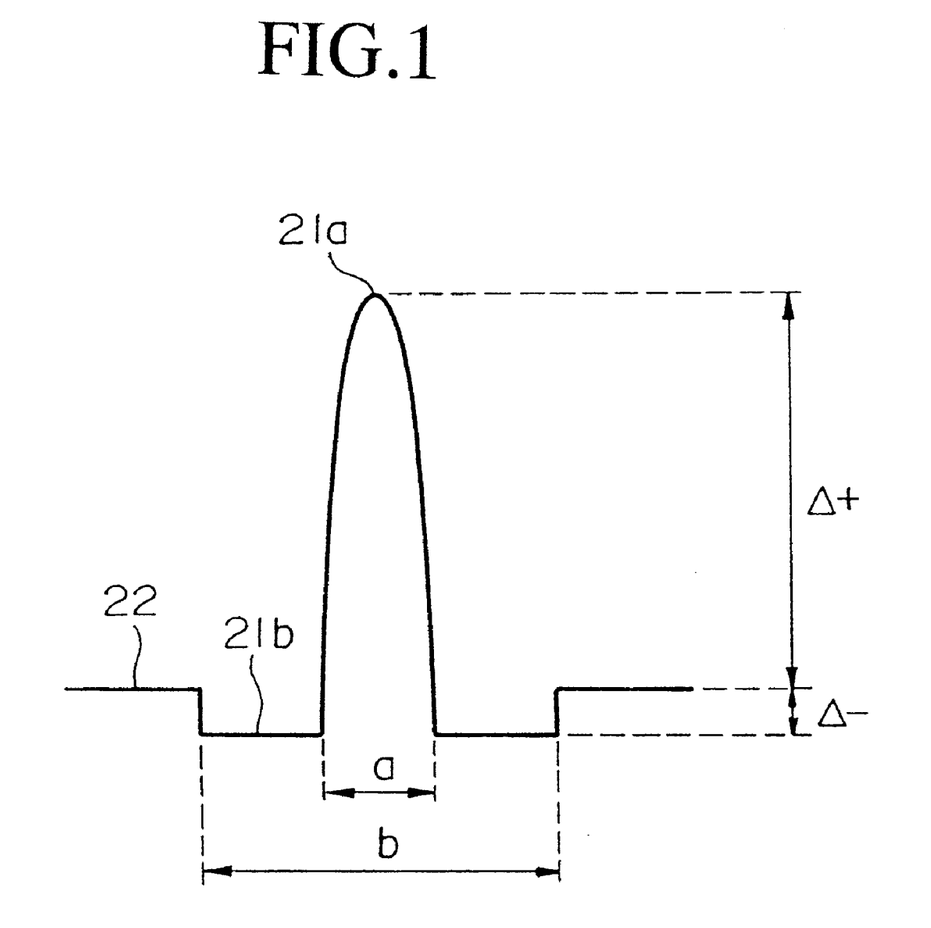
FIG. 1 is a drawing showing an example of a W-shaped profile which is a refractive index profile of the dispersion compensating optical fiber of the present invention.

To resolve this problem, a dispersion compensating optical fiber having a W-shaped refractive index profile (hereafter called a "W-shaped profile") shown in FIG. 1 has been developed and evaluated recently.

The W-shaped profile comprises a central core 21a, a middle part 21b surrounding the central core 21a and having a lower refractive index than the central core 21a, and a cladding 22 surrounding this middle part 21 and having a higher refractive index than the middle part 21 and a lower refractive index than the central core 21a.

The above-mentioned central core 21a has a bell-shaped refractive index that decreases radially. The above-mentioned middle part 21 and the cladding 22 both are annular.

Generally, the central core 21a consists of silica glass doped with germanium to increase the refractive index, the middle part 21b consists of silica glass doped with fluorine to decrease the refractive index, and the cladding 22 consists of pure silica glass.

Additionally, a is the outer diameter of the central core 21a; b is the outer diameter of the middle part 21b; Δ− is the relative refractive index difference of the cladding 22 to the middle part 21 and Δ+ is the relative refractive index difference of cladding 22 to the central core 21a.

Δ− and Δ+ show a refractive index of the cladding 22 being the standard (zero), with Δ− being a negative value, and Δ+ being a positive value.

The dispersion compensating optical fiber having this W-shaped profile can make the dispersion slope small, but because of the influence of the fluorine doped into the middle part 21b, there is a problem in that the transmission loss increases.

Figure 2:
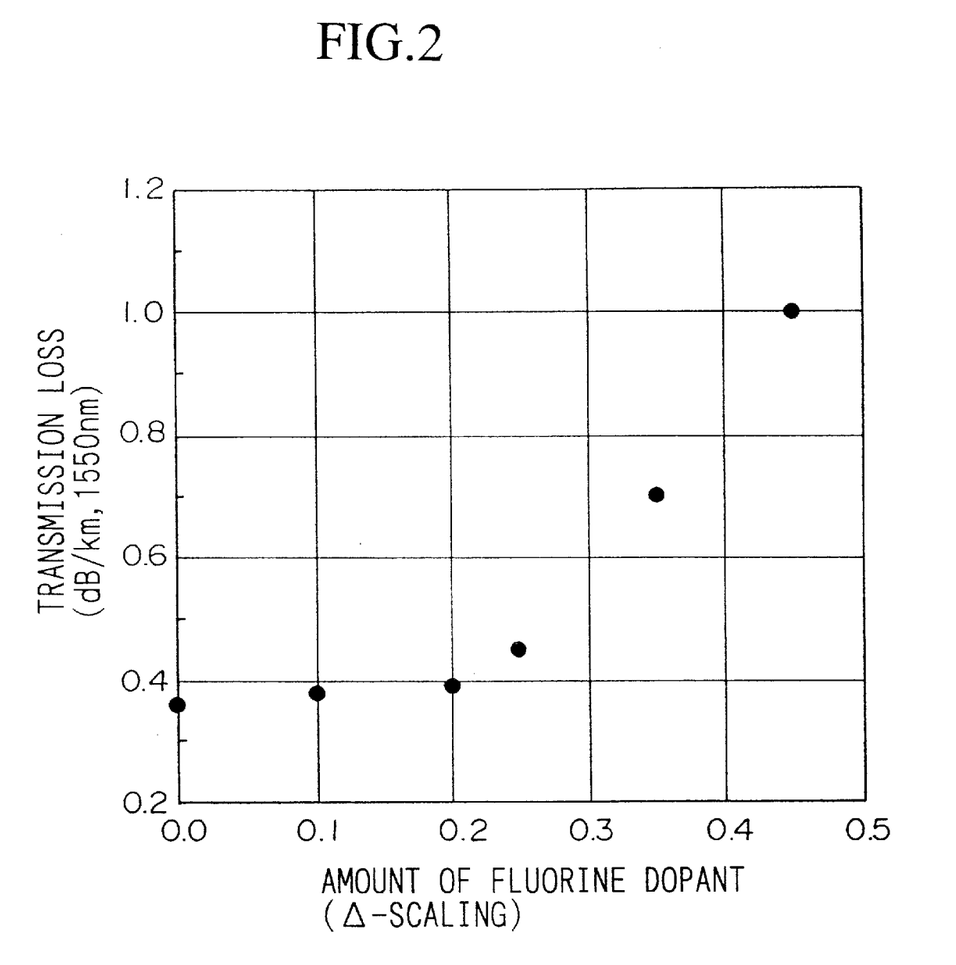
FIG. 2 is a graph showing the relationship between the change in Δ− due to the fluorine dopant in the W-shaped profile of the middle part and the transmission loss of the dispersion compensating optical fiber.

FIG. 2 is a graph showing the relation between the change in Δ− as a function of the fluorine doping, and the transmission loss. The abscissa of the graph shows the absolute value of Δ−. That is, the larger the value of the abscissa, the more the value of Δ− shifts towards the negative, and in practice, the value of Δ− becomes small.

It is apparent from this graph that when Δ− becomes less than −0.2%, the transmission loss becomes extremely large.

In the conventional W-shaped profile, because Δ− is designed to fall between about −0.3 ∼−0.45% in order to make the dispersion slope small, the transmission loss becomes large.

In the production of dispersion compensating optical fibers having this W-shaped profile, we believe it is advantageous to use the VAD method (Vapor-phase Axial Deposition Method) disclosed in Japanese Patent Application, First Publication Hei 7-157328 proposed by the present applicants, and to utilize a method of production by continuous manufacture of the part comprising a preform (fiber base material) for the central core $21a$ and the middle part $21b$.

However, this method cannot under the present circumstances be utilized for a dispersion compensating optical fiber having the conventional W-shaped profile because the amount of the fluorine doping is large.

It is known that the melting point of silica glass with a dopant such as germanium or fluorine is lower than that of pure silica glass.

The method exploits this difference in melting points to produce the preform, and specifically, the following fabrication method can be conceived.

In the following preform, there are the central core base material that becomes the central core $21a$, the middle part base material that becomes the middle part $21$ and the cladding base material that becomes the cladding $22$.

Specifically, by the VAD method, a cylindrical porous body is formed by depositing particles of germanium doped silica glass in the central part, and peripherally depositing pure silica glass particles.

When this porous body is heated in a furnace to a temperature higher than the melting point of the above-mentioned germanium-doped silica glass and lower than the melting point of pure silica glass, only the germanium-doped silica glass particles in the center is begins to progress to a transparent glass.

Further, when this porous body is heated to a temperature higher than the melting point of pure silica glass in a gas environment including fluorine, peripheral pure silica particles progress to a transparent glass, and a transparent glass rod selectively doped with fluorine in the periphery is obtained.

At this point, the germanium-doped silica glass is made into a transparent glass by the previous process, and because its bulk density is increased, it is possible to selectively dope only the peripheral pure silica glass particles with fluorine.

Furthermore, on the periphery of this transparent glass rod, by the OVD process (Outside Deposition Process), pure silica glass particles are deposited, and when heated above the melting point of pure silica glass, it is made into a transparent glass, forming the part that will become the cladding $22$, yielding the preform.

Finally, this preform is drawn out forming an optical fiber having an outer diameter of about 125 μm.

In continuous manufacture, this method is effective in allowing the formation of a central core base material and middle part base material having different dopants.

However, in a conventional W-shaped profile, the fluorine doped into the middle part $21b$ is greater than 1.2 wt. %, and because this is a large amount, the refractive index of the central core base material is lowered due to the fluorine, resulting in this method to having problems in practical application.

Anticipating the influence of this fluorine, one can conceive of a method, for example, in which the amount of the germanium doping agent is great, but then the problem of increased cost arises. Also, trial-and-error preliminary experiments to ascertain the materials formation and production conditions are necessary.

For this reason, dispersion compensating optical fibers having a W-shaped profile are manufactured by a method wherein the central core base material that becomes the central core $21a$ is produced by the VAD method, and then the fluorine-doped silica glass that becomes the middle part $21b$ is added to the outside.

However, this method caused a roughness on the outer peripheral surface of the central core base material due to the large amount of germanium doping. Consequently, an operation which smoothes this surface by external abrasion is necessary.

An eccentricity in the central core base material is produced due to this external abrasion, a new problem arises in that the polarization mode dispersion becomes large.

In addition, the production processes are complicated, and there is the possibility of contamination of the surface of the central core base material during production.

SUMMARY OF THE INVENTION

The object of the present invention is to provide a dispersion compensating fiber that can compensate the chromatic dispersion of a 1.3 μm SMF, and at the same time has a small dispersion slope and a small transmission loss.

It is a further object to provide a dispersion compensating optical fiber that can be made as efficiently as possible, and has a small polarization mode dispersion.

In order to solve the above-mentioned problems, we propose a dispersion compensating optical fiber having a central core, a middle part surrounding the central core and having a lower refractive index than this central core, and a cladding surrounding the middle part and having a higher refractive index than this middle part and a refractive index lower than the central core; the outer diameter of the above-mentioned middle part being 2.5∼3.5 times the outer diameter of the above-mentioned central core, and a relative refractive index difference of the above-mentioned cladding to the above-mentioned middle part being −0.08∼−0.2%, with the refractive index of the cladding being zero; and having a substantially single-mode transmission in the wavelength 1.55 μm band, the chromatic dispersion being −80 ps/nm /km or less, the dispersion slope being +0.08 ps/nm$^2$/km or less, and the bending loss being 1.0 dB/m or less.

We propose a dispersion compensating optical fiber having a dispersion slope made smaller than a chromatic dispersion compensating optical fiber having a single-peak profile, and at the same time having a transmission loss smaller than a dispersion compensating optical fiber having a conventional W-shaped profile by being designed such that appropriate values are selected from the above numerical range of the proportion of the outer diameter of the above-described middle part to the outer diameter of the central core, and the above relative refractive index of the cladding to the middle part.

Specifically, a dispersion compensating optical fiber having a transmission loss in the wavelength 1.55 μm band of 0.39 dB/km or less is proposed.

When the compensating optical fiber is used in conjunction with a 1.3 μm SMF in an optical communication system, the compensating optical fiber can compensate the chromatic dispersion of the 1.3 μm SMF, and has a low bending loss, a low transmission loss, and a low dispersion slope.

In addition, it is low cost because the amount of fluorine dopant used is much smaller than the conventional amount.

Furthermore, the dispersion compensating optical fiber of the present invention can be selectively and efficiently doped with germanium and fluorine during manufacture by a VAD method which advantageously uses the difference in melting points between pure silica glass and doped silica glass because the amount of fluorine dopant in the middle part is small.

Due to this, the amount of germanium and fluorine dopants can be minimized, and in addition, the number of preliminary experiments to determine production conditions becomes small, producing a measurable lowering of cost.

Finally, in contrast to the conventional production method, polarization mode dispersion is not increased because external abrasion is unnecessary.

DESCRIPTION OF THE PREFERRED EMBODIMENTS

Below, a detailed description will be given of the present invention.

In the present invention, using the relationship between the change in Δ− caused by the fluorine dopant and the transmission loss shown in FIG. 2, we investigated whether a dispersion compensating optical fiber with a small dispersion slope could be designed even if the range of Δ− is −0.2% or more in the case of the W-shaped profile shown in FIG. 1.

From the graph shown in FIG. 2, we can predict the same degree of transmission loss as the single-peak profile shown in FIG. 7 having no fluorine dopant if Δ− is more than −0.2%.

In addition, in this case, when producing a preform doped with fluorine, the concentration of fluorine gas in the atmospheric gas in the furnace is 1% by volume or less. Thus, the cost can be expected to drop dramatically because the above-mentioned fluorine gas concentration is approximately 6% by volume when Δ− is −0.3%, for example, for the conventional W-shaped profile.

Here, the target values for the dispersion compensating optical fiber that we expect to be realized has a substantially single-mode propagation in the wavelength 1.55 μm band, a chromatic dispersion of −80 ps/nm/km or less, a dispersion slope of +0.08 ps/nm²/km or less, and a bending loss of 1.0 dB/m or less.

In the present invention, a wavelength in the 1.55 μm band indicates a wavelength range from 1530 nm to 1580 nm.

In the 1.55 μm band, when the chromatic dispersion is greater than −80 ps/nm/km and approaching zero, the longer the length of dispersion compensating optical fiber used, the more disadvantageous it becomes.

In addition, the dispersion slope of the optical communication system as a whole becomes small because the dispersion slope of the dispersion compensating optical fiber is +0.08 ps/nm²/km or less in the wavelength 1.55 μm band.

The bending loss is a for a diameter of curvature (2R) of 20 mm in wavelength 1.55 μm band.

The dispersion compensating optical fiber is usually inserted within a transmission path which is wrapped in a small coil, and if the bending loss exceeds 1.0 dB/m, this large loss renders the fiber unusable.

Furthermore, the dispersion compensating optical fiber always requires single-mode transmission in the conditions of actual use in the 1.55 μm band because it usually compensates a 1.3 μm SMF.

Because of this, in conditions of actual use, the cut-off wavelength must guarantee a substantially single-mode propagation.

The cut-off wavelength is the value measured in the CCITT 2 m method or the conditions of actual use.

When a dispersion compensating optical fiber satisfying the above mentioned target values for chromatic dispersion, dispersion slope, and bending loss is used in conjunction with, for example, a 1.3 μm SMF being the object of compensation in an optical communication system, it becomes able to compensate the chromatic dispersion of the 1.3 μm SMF, has a small bending loss, and can make the dispersion slope of the optical system as a whole small.

In addition, in the W-shaped profile shown in FIG. 1, our tests assumed the central core 21a consists of silica glass doped with germanium, the middle part 21b consists of silica glass doped with fluorine, and the cladding 22 consists of pure silica glass.

As will be described below in the detailed data, by selecting an appropriate combination of b/a in a range of 2.5~3.5, and Δ− between −0.08~0.2%, we could make the dispersion slope less than a dispersion compensating optical fiber having a single-peak profile. At the same time, we could offer a dispersion compensating optical fiber with a transmission loss less than a conventional dispersion compensating optical fiber with a W-shaped profile.

Specifically, in the wavelength 1.55 μm band, a dispersion compensating optical fiber with a transmission loss of 0.39 dB or less is obtained.

Because the difference with the single-peak profile becomes small when b/a is less than 2.5, the characteristics of a W-shaped profile can not be obtained, and the dispersion slope could not be made small. When it exceeds 3.5, there is a tendency for the chromatic dispersion wavelength to increase, making it difficult to obtain advantageous characteristics.

In addition, a is usually between 2.3~3.0 μm. When it is lower then 2.3 μm, the bending loss becomes large, and for this reason is disadvantageous. When it exceeds 3.0 μm, the chromatic dispersion tends to increase, so again advantageous characteristics cannot be obtained.

When a and b/a are determined, b is also determined.

Δ+ is between +2.0~2.8%. When it is less than +2.0%, the chromatic dispersion of the unit length cannot be enlarged in the minus direction, so advantageous characteristics cannot be obtained. When it exceeds +2.8%, it is practically difficult to produce.

FIGS. 3~6 show the results of a simulation of the relationship between the outer diameter a of the central core 21a of a dispersion compensating optical fiber having a W-shaped profile, and the chromatic dispersion, dispersion slope, and the bending loss for each value of Δ−.

Curved lines intersecting of the values for each b/a are shown in each graph.

Further, the upper values of the target values of the chromatic dispersion, the dispersion slope, and the bending loss are each shown with a broken line. In addition, in each graph the characteristics of a dispersion compensating optical fiber having a single-peak profile are shown for comparison.

Here, Δ and Δ+ are both +2.55%.

Figure 8:
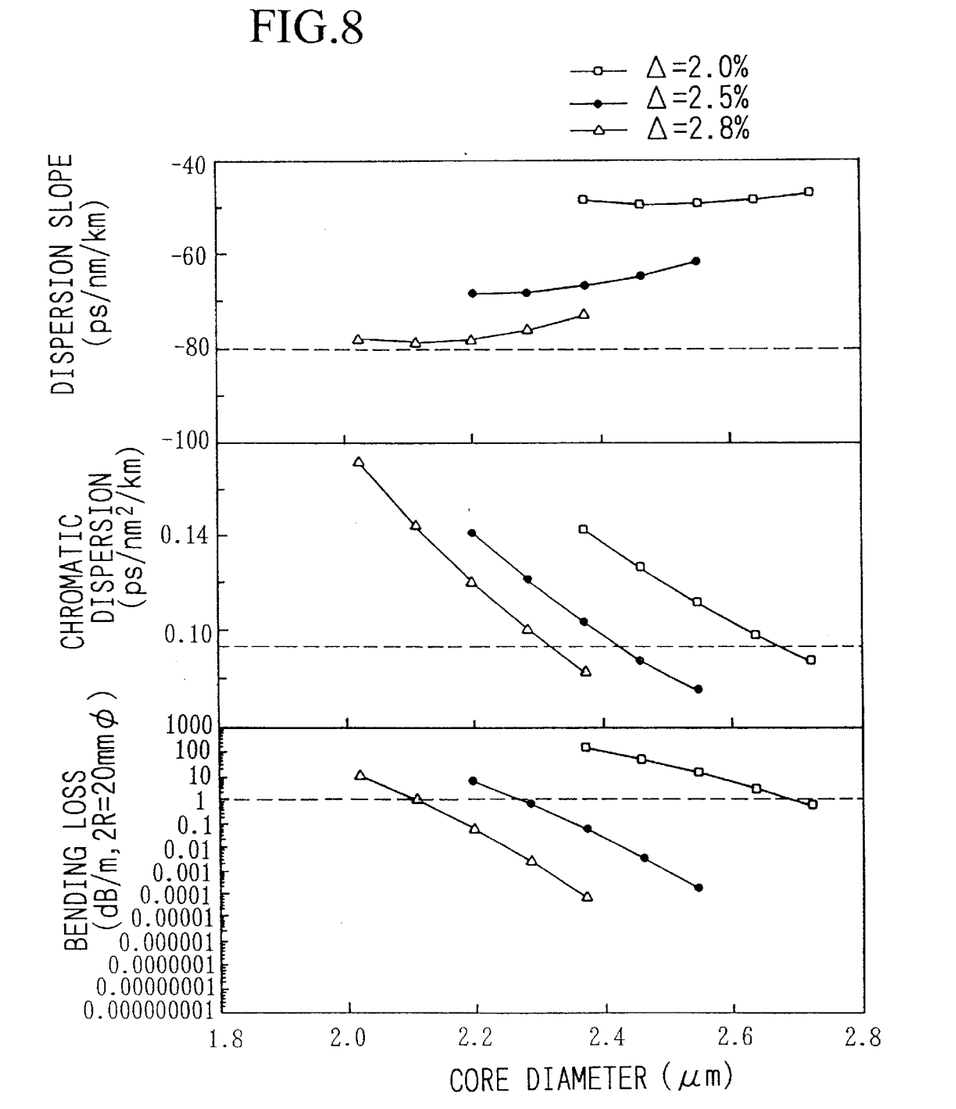
FIG. 8 is a graph showing the results of a simulation of the relationship between the core diameter of the single-peak profile and the chromatic dispersion, dispersion slope, and the bending loss.

In addition, FIG. 8 is a graph showing the results of a simulation of a single-peak profile as a function of a change of Δ.

From FIG. 8, it can be found that a range satisfying the characteristic values of the dispersion compensating optical fiber of the present invention do not exist in the single-peak profile.

The upper value of Δ is fixed at +2.8%, because production is difficult in practice when this value is exceeded.

Below, we investigate the characteristics of a dispersion compensating optical fiber having the W-shaped profile shown in FIGS. 3~6.

Figure 3:
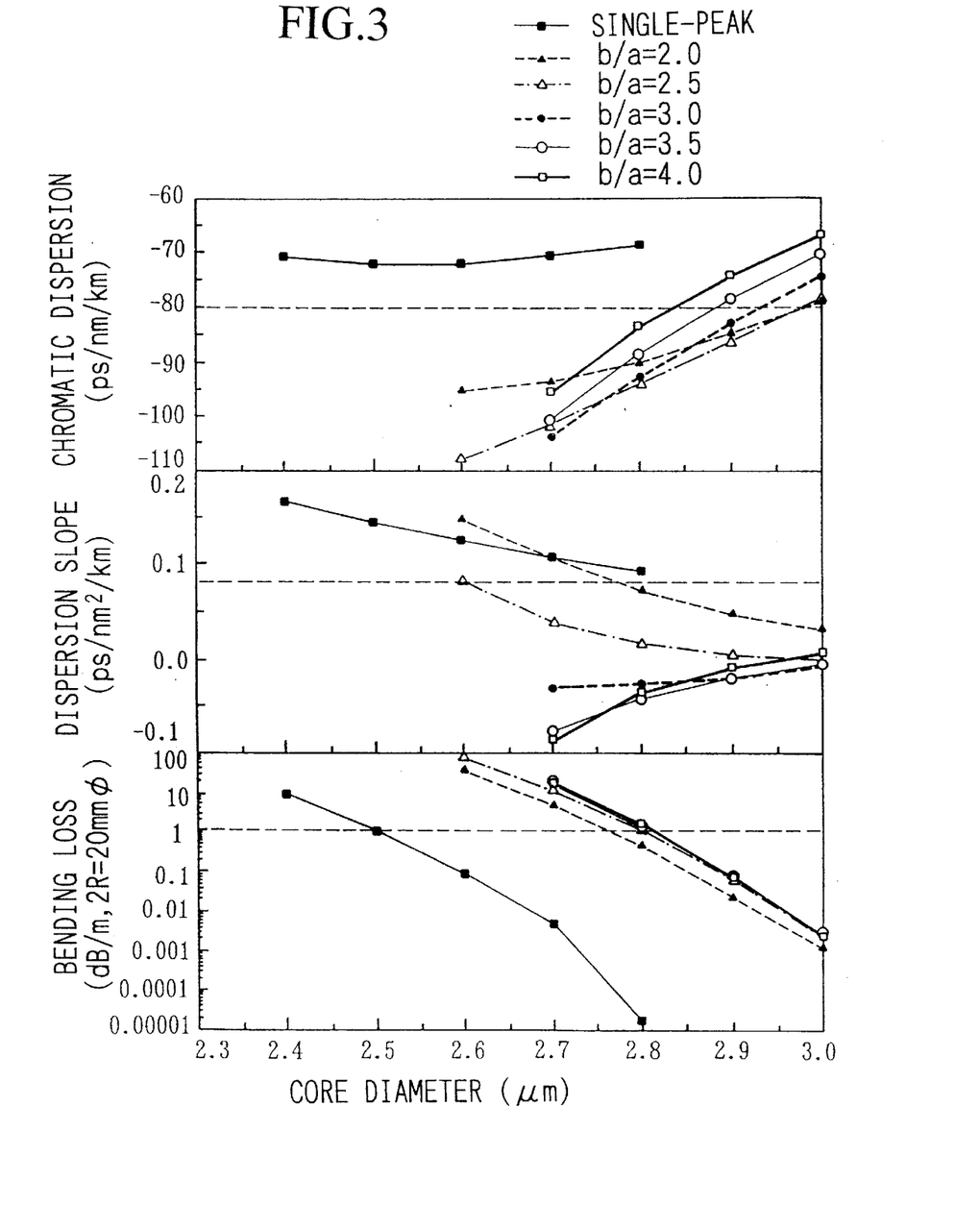
FIG. 3 is a graph showing the results of a simulation of the relationship between the outer diameter a of the W-shaped profile of the central core and the chromatic dispersion, dispersion slope, and the bending loss when Δ− is −0.2%.

FIG. 3 shows the results when Δ− is −0.2%.

Figure 4:
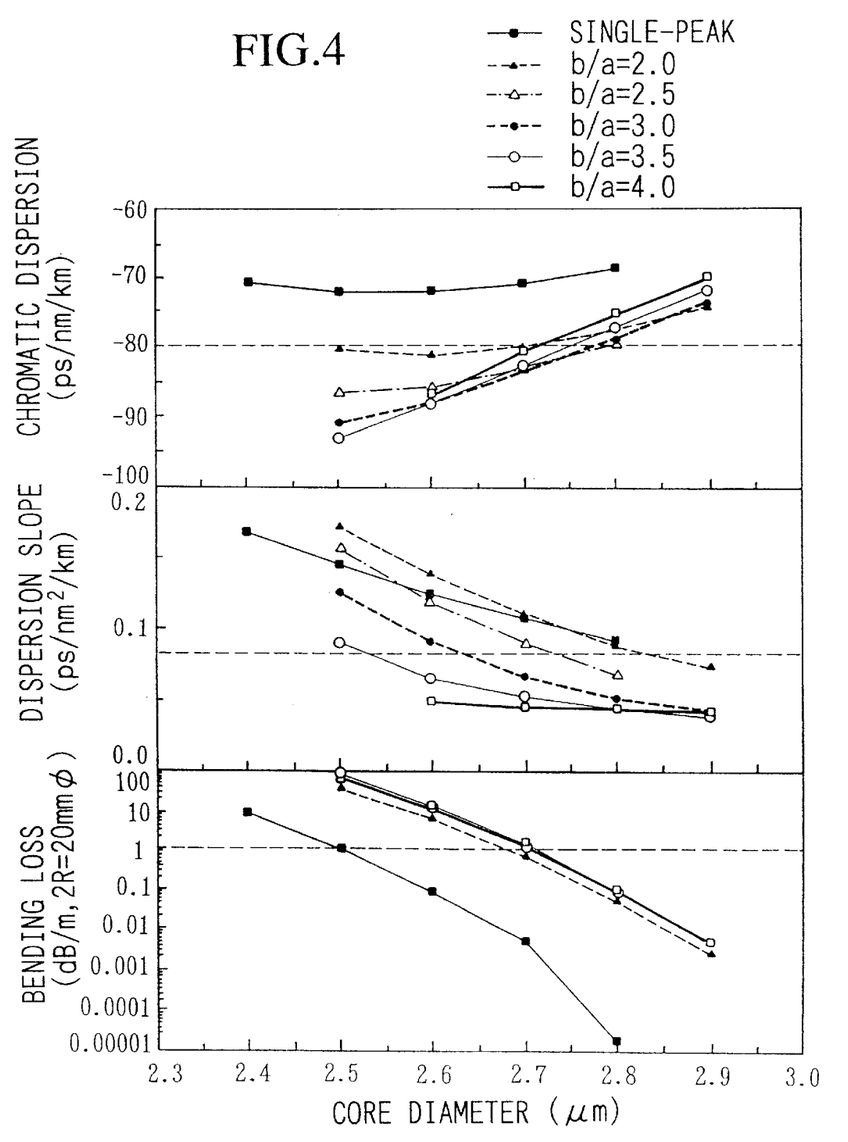
FIG. 4 is a similar graph of FIG. 3 when Δ− is −0.1%

FIG. 4 shows the result when Δ− is −0.1%.

Figure 5:
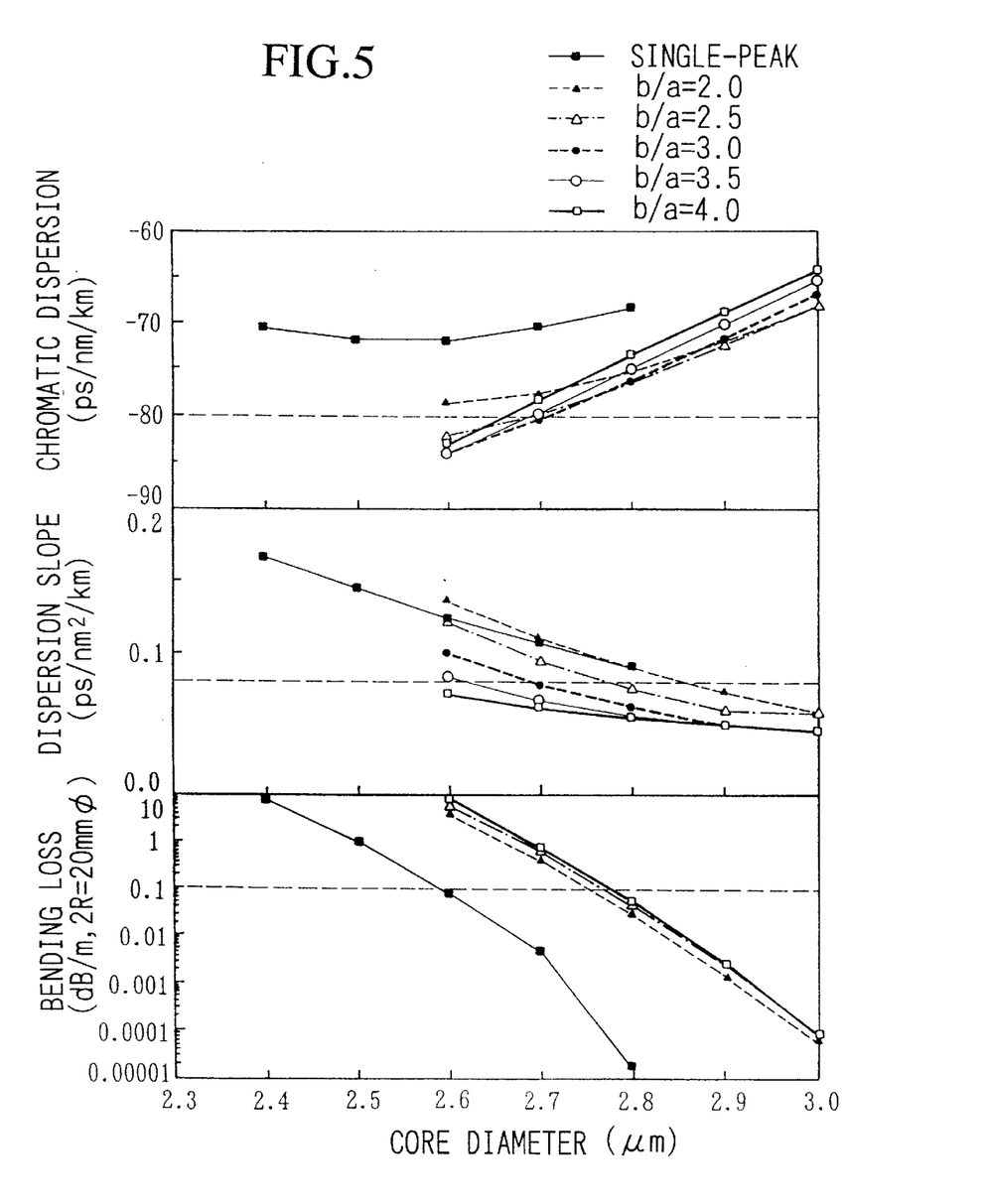
FIG. 5 is a similar graph of FIG. 3 when Δ− is −0.08%.

FIG. 5 shows the result when Δ− is −0.08%.

Figure 6:
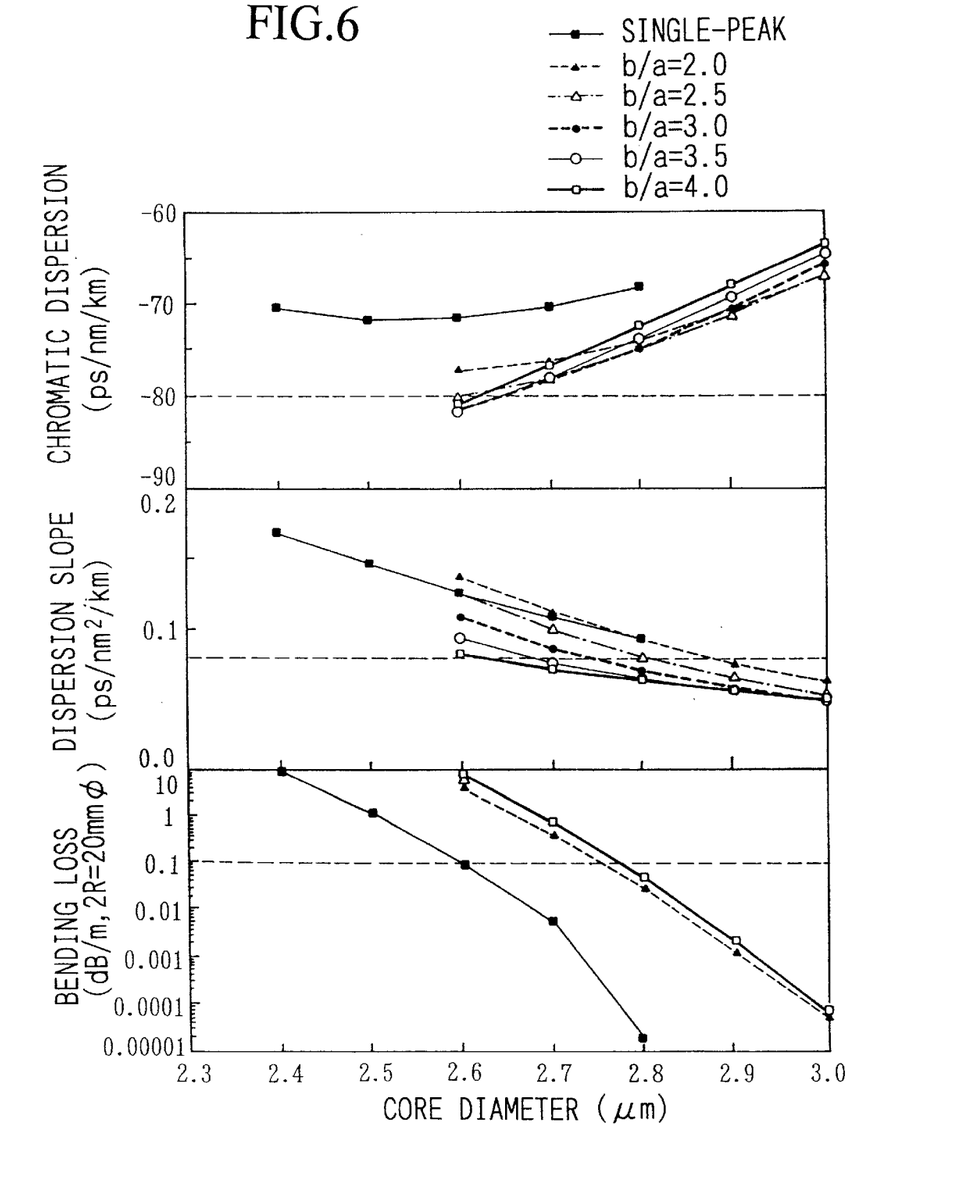
FIG. 6 is a similar graph of FIG. 3 when Δ− is −0.07%.

FIG. 6 shows the result when Δ− is −0.07%.

In FIGS. 3~6, each of the curved lines b/a=2.0 to 4.0 appearing in the graph show the relationship between core diameter and bending loss. Though some of them are difficult to distinguish because they are close and overlap, we can see that as the value of b/a increases, there is a tendency for the value of the bending loss to become large.

In FIGS. 3~5, there is a range satisfying part of the above-described target value characteristics.

In FIG. 6, the target value characteristics of the present invention are not all satisfied.

As can be surmised from FIGS. 3~5, even when the values of b/a and Δ− are within the above-described range, not all of them satisfy the target values of the chromatic dispersion, dispersion slope, and bending loss of the dispersion compensating optical fiber of the present invention.

That is, in order to satisfy the characteristics of the present invention, the values of b/a and Δ− cannot be chosen randomly from the above-described range, but must be fixed at appropriate combinations of a, b, and Δ− as found in the graphs shown in FIGS. 3~5.

Therefore, it is difficult to specify the dispersion compensating optical fiber of the present invention within the range of numerical values b/a and Δ−.

Because of this, along with the above-described range of numerical values of b/a and Δ−, the present invention must be specified by limiting the values of the chromatic dispersion, dispersion slope, and bending loss.

Such characteristics cannot be obtained by dispersion compensating optical fibers having conventional single-peak or W-shaped profiles.

Moreover, the dispersion compensating optical fiber of the present invention can be manufactured by VAD method using the method disclosed in Japanese Patent Application, First Publication, Hei 7-157328.

Specifically, in the VAD method, a cylindrical porous body is formed from deposited particles of germanium doped silica glass in the central part, around which are deposited pure silica glass particles.

This porous body is a compact element which can collect glass particles produced in a flame (an oxygen burner, for example) by the VAD method. This porous body has a certain degree of mechanical strength, and because gaps and air bubbles through which gases can flow remain throughout, it is optically opaque.

In the above-mentioned porous body, the germanium-doped silica glass particles in the center have a lower melting point than the pure silica glass particles disposed around it.

Next, after dehydrating the above-mentioned porous body as necessary in a helium gas atmosphere which includes chlorine gas, only the central part consisting of the germanium-doped silica glass particles become a transparent glass in helium gas atmosphere, and this can be stretched out thinly by heating as necessary.

The above-mentioned temperature which makes the central part into the transparent glass is equal to or greater than the melting point of the germanium-doped silica glass, and less than the melting point of the pure silica glass. Such a temperature setting will make only the germanium-doped silica glass particles in the center into the transparent glass.

Next, it is advantageous that after dehydration in a helium atmosphere including chlorine, the porous body is heated to or above the melting point of pure silica glass in a atmosphere which includes fluorine, such as a gas mixture of $SiF_4$ and helium gas, and as the outer layer consisting of the above pure silica glass particles is made into a transparent glass, this outer layer is doped with fluorine, and a transparent glass rod consisting of the central core base material and the middle part base material is fabricated.

Furthermore, on the exterior of this transparent glass rod, pure silica glass particles are deposited by the OVD process using, for example, an oxygen burner, and it is advantageous that after dehydration in a helium gas atmosphere including chlorine gas, this product be heated to or above the melting point of pure silica glass in a helium gas atmosphere, made into a transparent glass, formed into the cladding base material, yielding the preform.

Finally, this preform is drawn out, and made into an optical fiber with an outer diameter of approximately 125 μm.

In the dispersion compensating optical fiber of the present invention, there is almost no contamination of the central core base material with fluorine because the amount of fluorine dopant is small.

Thus, fluorine can be selectively and efficiently doped into the middle part base material, and component materials can be used depending on the design criteria.

That is to say, germanium and fluorine can be used in the minimum necessary amounts to increase or decrease the refractive index, and also, the number of preliminary experiments to determine the conditions of manufacture become small, and the cost of design can be lowered.

Also, in contrast to the conventional manufacturing method, there is no increase in polarization mode dispersion because there is no need for external abrasion.

PREFERRED EMBODIMENTS

Below, the preferred embodiments of the present invention will be explained in detail.

Embodiment 1

In the production of an optical fiber having the W-shaped profile shown in FIG. 1, $\Delta-$ was $-0.1\%$, the core diameter a was 2.7 µm, and the b/a was 3.5.

The manufacturing method utilized the VAD method for carrying out formation of the central core base material and the middle part base material in continuous production.

First, a cylindrical porous body with an outer diameter of 120 mm was produced by the VAD method using an oxygen burner, comprising a center consisting of silica glass particles doped with germanium 26 wt. % and a periphery consisting of pure silica glass particles. The density of this porous body was 0.2 g/cm$^3$.

After dehydration in a helium gas atmosphere including chlorine gas at about 1000° C., only the germanium-doped silica glass particles in the center began to made into a glass in a helium gas atmosphere at 1150° C., which caused the bulk density to increase.

Next, in a mixed atmosphere consisting of SiF$_4$ gas (1 cc/min) and helium gas (6 l/min) at about 1420° C., as the peripheral pure silica glass particles were made into a transparent glass, 0.4 wt. % fluorine was doped into the transparent glass in order to make $\Delta-$ become $-0.1\%$, obtaining a transparent glass rod.

When the fluorine concentration of the cross-section of this transparent glass rod was analyzed, almost no fluorine was included in the central core base material, which was the center of the transparent rod.

Pure silica glass particles was deposited on the periphery of this transparent glass rod by the OVD process using an oxygen burner, and after a further dehydration in a helium gas atmosphere including chlorine gas at about 1000° C., a transparent glass in a helium gas atmosphere was produced at approximately 1500° C. This process was repeated 3 times, obtaining a preform with an outer diameter of 40 mm.

Finally, the preform was drawn into an optical fiber with about a 125 µm outer diameter.

Embodiment 2

The process of manufacture was the same as Embodiment 1, except that $\Delta-$ was $-0.2\%$, fluorine was doped at 0.8 wt. %, and when the fluorine dopant was added, the supply velocity of SiF$_4$ gas was 6 cc/min, and the supply velocity of helium gas was 6 l/min.

Embodiment 3

This embodiment was the same as Embodiment 1, except that the step of fluorine doping of the middle part base material and the step of making the middle part base material into a transparent glass were performed separately.

That is, a porous body having a two-layered structure comprising germanium-doped silica glass particles and pure silica glass particles was formed, and only the germanium-doped silica glass particles at the center began to be made into a transparent glass at about 1150° C., increasing the bulk density.

Next, at 1200° C., after fluorine doping at 0.4 wt. % in an atmosphere consisting of a mixture of SiF$_4$ gas (1 cc/min) and helium gas (6 l/min) to yield $\Delta-$ of $-0.1\%$ in the peripheral pure silica glass particles, a transparent glass rod was formed by in a helium atmosphere at 1420° C.

Chart 1 shows the characteristics of the dispersion compensating optical fiber of embodiments 1~3.

MFD is the mode field diameter, and the FOM (figure of merit) is the value of the chromatic dispersion per unit loss.

The cut-off wavelength ($\lambda_c$) was the value measured by the CCITT 2 m method.

As is apparent form Chart 1, the dispersion compensating optical fibers of embodiments 1~3 of the present invention satisfied the target values for chromatic dispersion, dispersion slope, and bending loss of the present invention.

Additionally, the transmission loss and the polarization mode dispersion were small.

Furthermore, in embodiments 1 and 3, it was confirmed that even when the step of making the middle part base material into a transparent glass and the step of fluorine doping were carried out in separately, the characteristics obtained were almost identical.

Comparative Example 1

An optical fiber having a single-peak refraction index profile was produced.

A cylindrical porous body with an outer diameter of 120 mm comprising a center consisting of 25 wt. % germanium-doped silica glass particles and a periphery consisting of pure silica glass particles was produced by the VAD method.

The density of this porous body was 0.2 g/cm$^3$.

After dehydrating this porous body at 1000° C. in a helium gas atmosphere including chlorine gas, it was made into a transparent glass in a helium gas atmosphere at about 1500° C., yielding a transparent glass rod.

Next, this transparent glass rod was stretched out thinly be heating.

Further, pure silica glass particles are deposited on its periphery by the OVD process using an oxygen burner, and after dehydrating again in a helium gas atmosphere including chlorine at 1000° C., a transparent glass in a helium gas atmosphere was produced at about 1500° C. This process was repeated 3 times, obtaining a preform with an outer diameter of 40 mm.

Finally, this preform is drawn out producing an optical fiber with an outer diameter of 125 µn.

The optical fiber of this comparative example 1 has the single-peak refractive index profile shown in FIG. 7, a core diameter of 2.5 µm, and a 2.5% relative refractive index difference of the core to the cladding.

The characteristics of this optical fiber are shown in Chart 2.

It is apparent from Chart 2, that the single-peak profile has a large dispersion slope.

Comparative Example 2

In producing the optical fiber having the W-shaped profile shown in FIG. 1, $\Delta-$ was set at $-0.35\%$ and b/a at 2.5.

The method of manufacture uses a different manufacturing sequence wherein the middle part base material and the cladding base material are fabricated on the periphery of the central core base material after the central core base material has been produced by the VAD method.

First, a cylindrical porous body with an outer diameter of 30 m and a density of 0.25 g/cm³ consisting of 25 wt. % germanium doped silica glass particles was produced by the VAD method using an oxygen burner.

After dehydrating this porous body at about 1000° C. in a helium gas atmosphere including chlorine gas, it is made into a transparent glass in a helium gas atmosphere at about 1400° C. to produce a transparent glass rod.

This transparent glass rod had to be smoothed by external abrasion because its surface was rough due to the high concentration of germanium.

Next, this transparent rod was stretched out thinly by heating.

Pure silica glass particles are deposited on the periphery of this stretched out transparent glass rod by the OVD process using an oxygen gas burner.

Next, after dehydration in a helium gas atmosphere including chlorine at about 1000° C. again, the pure silica glass particles were doped with fluorine at 1.2 wt. % in an atmosphere mixing $SiF_4$ gas (300 cc/min) and helium gas (5 l/min) at about 1380° C., and made into a transparent glass.

Further, pure silica glass was deposited on the periphery of this glass rod by the OVD process using an oxygen burner, and after dehydration again in a helium gas atmosphere including chlorine gas at about 1000° C., a transparent glass was produced at about 1500° C. This process was repeated 3 times, obtaining a preform with an outer diameter of 40 mm.

Finally, this preform is drawn out into an optical fiber with an outer diameter of 125 μm.

Chart 3 shows the characteristics of this optical fiber.

Δ− was −0.35%, and since its absolute value was large, it was necessary to use a large amount of fluorine dopant which in turn causes an increase in transmission loss.

Also, the polarization mode dispersion was large because it was necessary to apply external abrasion to the surface of the central core base material.

Comparative Example 3

In the production of the optical fiber having the W-shaped profile shown in FIG. 1, Δ− was −0.35% and b/a was 2.5.

The manufacturing method adapted a VAD method wherein the formation of the central core base material and the middle part base material porous body, making a transparent glass, and fluorine doping was carried out in a continuous process.

First, a cylindrical porous body with an outer diameter of 120 mm comprising a center consisting of 26 wt. % germanium-doped silica glass particles and a periphery consisting of pure silica glass particles was formed. The density of this porous body was 0.2 g/cm³. After dehydrating this porous body at 1000° C. in a helium gas atmosphere including chlorine gas, only the germanium-doped silica glass particles in the center began to made into a transparent glass, raising the bulk density.

Then, in an atmosphere mixing $SiF_4$ gas (300 cc/min) and helium gas (5 l/min) at about 1380° C., as the peripheral pure silica glass particles were made into a transparent glass, the part comprising the pure silica glass particles were doped with 2.0 wt % fluoride dopant, and a transparent glass rod was obtained.

When the refractive index of each part of this transparent glass rod is measured, the refractive index of the central core base material is lower than the original germanium-doped glass particles, thus showing the influence of fluorine dopant.

Then in continuing the process of making the germanium-doped silica glass particles into glass, when the thermal processing temperature applied to raise its bulk density was set at about 1200°, the pure silica glass particles of the periphery could not be adequately doped with fluorine.

Thus, anticipating this lowering of the refractive index, initially 29 wt. % germanium-doped silica glass particles are used in order to increase the true refractive index of the central core 21a, and when the transparent glass rod is again fabricated according to the above described process, the refractive index of the central core base material was lower than the initial refractive index of the germanium-doped silica glass, yielding the desired refractive index for the central core base material.

Pure glass silica particles were deposited on the periphery of this transparent glass rod by the OVD process using an oxygen burner, and after dehydration again in a helium gas atmosphere including chlorine at 1000° C., a transparent glass was produced at 1500° C. This process was repeated 3 times yielding a preform with an outer diameter of 40 mm.

Finally, this preform was drawn out into an optical fiber with an outer diameter of 125 μm.

Chart 3 shows the characteristics of this optical fiber.

Δ− is 0.35%, and because it was necessary to use a large amount of fluorine dopant, the transmission loss became large.

In addition, because it was necessary to use a large amount of germanium dopant in anticipation of the lowering of the refractive index of the central core base material described above, it is clear that the cost becomes expensive.

Chart 1

| | Embodiment 1 | Embodiment 2 | Embodiment 3 |
|---|---|---|---|
| b/a | 3.5 | 3.5 | 3.5 |
| Δ− | −0.10 | −0.20 | −0.10 |
| Transmission loss dB/km @ 1550 nm | 0.38 | 0.39 | 0.37 |
| Chromatic dispersion ps/nm/km @ 1550 nm | −84 | −88 | −84 |
| Dispersion slope ps/nm²/km | +0.05 | −0.04 | +0.05 |
| Bending loss dB/km @ 1550 | 0.40 | 0.43 | 0.40 |
| Polarization mode dispersion ps/rkm | 0.15 | 0.15 | 0.15 |
| MFD μm @ 1550 nm | 5.5 | 4.5 | 5.5 |
| $\lambda_o$ μm | 0.73 | 0.74 | 0.73 |
| FOM ps/nm/km @ 1550 nm | 221 | 226 | 227 |

Measured values except polarization mode dispersion were measured at 1.55 μm.
Polarization mode dispersion was measured in the 1.55 μm band.

Chart 2

| Transmission loss | 0.37 dB/km |
|---|---|
| Chromatic dispersion | −75 ps/nm/km |
| Dispersion slope | +0.13 ps/nm²/km |
| Polarization mode dispersion | 0.15 ps/rkm |

Chart 2 -continued

| | |
|---|---|
| MFD | 5.0 μm |
| FOM (figure of merit) | 202 ps/nm/dB |

Measured values except polarization mode dispersion were measured at 1.55 μm.
Polarization mode dispersion was measured in the 1.55 μm band.

Cart 3

| | Comparative Example 2 | Comparative Example 3 |
|---|---|---|
| b/a | 2.5 | 2.5 |
| Δ- | -0.35 | -0.35 |
| Transmission loss dB/km @ 1550 nm | 0.45 | 0.45 |
| Chromatic dispersion ps/nm/km @ 1550 nm | -120 | -120 |
| Dispersion slope ps/nm$^2$/km | -0.49 | -0.49 |
| Bending loss dB/km @ 1550 | 0.8 | 0.8 |
| Polarization mode dispersion ps/rkm | 0.30 | 0.15 |
| MFD μm @ 1550 nm | 4.4 | 4.4 |
| λ$_c$ μm | 0.80 | 0.80 |
| FOM ps/nm/km @ 1550 nm | 288 | 218 |

Measured values except polarization mode dispersion were measured at 1.55 μm.
Polarization mode dispersion was measured in the 1.55 μm band.

As is apparent from embodiments 1~3 and the results of comparative examples 1~3, the dispersion compensating optical fiber of the present invention has sufficiently small negative chromatic dispersion value to compensate a 1.3 SMF, and at the same time has a small dispersion slope.

Furthermore, because the amount of fluorine dopant is small, the cost becomes low and the transmission loss is small.

In addition, during manufacture, the influence of the fluorine dopant does not lower the refractive index of the central core base material, so by using the VAD method it is possible to manufacture the base material of the central core and the base material of the middle part with one continuous operation, which is very efficient.

Because the mutual influence of the dopants is small, if the material components are set in accordance with the conditions of design, the desired relative refraction index difference Δ- and Δ+ can be obtained.

Therefore, the amount of dopant is small, and the number of preliminary experiments for determining the conditions of production become small, further decreasing cost.

What is claimed is:

1. A dispersion compensating optical fiber comprising:
   a central core;
   a middle part surrounding said central core and having a refractive index lower than said central core; and
   a cladding surrounding said middle part and having a refractive index higher than said middle part and lower than said central core;
   wherein the core having:
   an outer diameter of said middle part is 2.5~3.5 times an outer diameter of said central core;
   a relative refractive index difference of said cladding to said middle part being -0.08~-0.2%, with the refractive index of the cladding is zero; and
   substantially single-mode transmission in the wavelength 1.55 μm band, the chromatic dispersion being -80 ps/nm/km or less, the dispersion slope being +0.08 ps/nm$^2$/km or less, and the bending loss being 1.0 dB/m or less.

2. A dispersion compensating optical fiber according to claim 1, wherein:
   said central core comprising germanium-doped silica glass, said middle part comprising fluoride-doped silica glass; and
   said cladding comprising pure silica glass.

3. A dispersion compensating optical fiber according to claim 1, wherein:
   said wavelength 1.55 μm band is in the wavelength range from 1530 nm to 1580 nm;
   a value of the cut-off wavelength ensures substantially single-mode transmission in said wavelength 1.55 μm band under conditions of actual use; and
   the bending loss is for a diameter of curvature (2R) of 20 mm in the wavelength 1.55 μm band.

4. A dispersion compensating optical fiber according to claim 1, wherein an outer diameter of said central core is 2.3~3.0 μm.

5. A dispersion compensating optical fiber according to claim 1, wherein a relative refractive index difference of said cladding to said central core is +2.0%~2.8%, and the refractive index of said cladding being zero.

6. A method of producing a dispersion compensating optical fiber comprising the steps of:
   forming a cylindrical porous body by depositing germanium-doped silica glass particles in a central part, and pure silica glass particles thereon by a Vapor-phase Axial Deposition Method;
   heating said porous body to a temperature to or above the melting point of said germanium-doped silica glass particles and to or below the melting point of said pure silica glass particles;
   heating the porous body in an atmosphere including fluorine to a temperature to or above the melting point of said pure silica glass particles, to yield a transparent glass rod which comprises the central core base material and a middle part base material;
   depositing pure silica glass particles on said transparent glass rod by the Vapor-phase Axial Deposition Method;
   heating said transparent glass rod with pure silica glass particles deposited thereon to or above the melting point of said pure silica glass, forming a cladding base material to obtain a preform; and
   drawing out the preform to form a dispersion compensating optical fiber comprising:
   a central core, a middle part with a refractive index lower than said central core, and a cladding with a refractive index higher than said middle part and lower than said central core, characterized in:
   an outer diameter of said middle part being 2.5~3.5 times an outer diameter of said central core;
   a relative refractive index difference of said cladding to said middle part being -0.08~-0.2% with the refractive index of the cladding being zero; and
   having substantially single-mode transmission in the wavelength 1.55 μm band, the chromatic dispersion being -80 ps/nm/km or less, the dispersion slope being +0.08 ps/nm$^2$/km or less, and the bending loss being 1.0 dB/m or less.

* * * * *

UNITED STATES PATENT AND TRADEMARK OFFICE
CERTIFICATE OF CORRECTION

PATENT NO. : 5,995,695
DATED : November 30, 1999
INVENTOR(S) : Aikawa et al.

It is certified that error appears in the above-indentified patent and that said Letters Patent is hereby corrected as shown below:

Col. 4, line 52, "ps/mn$^2$/km" s/b --ps/nm$^2$/km--;

Signed and Sealed this

Twenty-third Day of January, 2001

Attest:

Q. TODD DICKINSON

Attesting Officer

Commissioner of Patents and Trademarks